(No Model.)
A. FRESCHL.
APPLICATION OF FABRICS TO MOLDING AND OTHER ARTICLES.
No. 293,158. Patented Feb. 5, 1884.
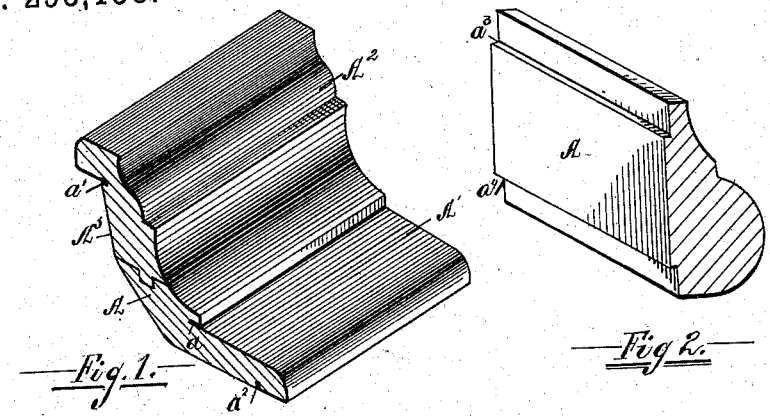
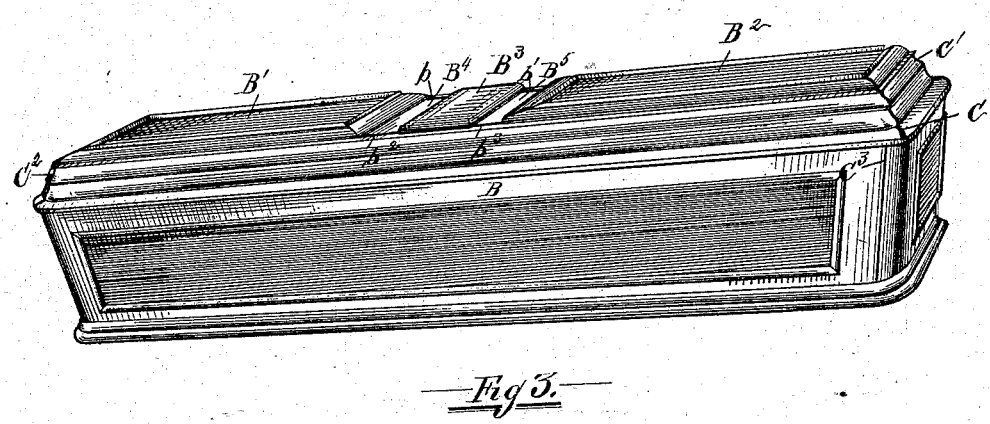

UNITED STATES PATENT OFFICE.

ALFRED FRESCHL, OF DETROIT, MICHIGAN, ASSIGNOR TO THE DETROIT CASKET COMPANY.

APPLICATION OF FABRICS TO MOLDINGS AND OTHER ARTICLES.

SPECIFICATION forming part of Letters Patent No. 293,158, dated February 5, 1884.

Application filed October 20, 1883. (No model.)

*To all whom it may concern:*

Be it known that I, ALFRED FRESCHL, of Detroit, county of Wayne, State of Michigan, have invented a new and useful Improvement in the Application of Fabrics to Moldings and other Articles; and I declare the following to be a full, clear, and exact description of the invention, such as will enable others skilled in the art to which it appertains to make and use it, reference being had to the accompanying drawings, which form a part of this specification.

My invention consists in an improved molding, and in the operation of applying fabric thereto and upon other articles of manufacture, hereinafter described, and more fully pointed out in the claim.

In the drawings, Figure 1 is a perspective view of a molding embodying my invention. Fig. 2 is a variation in section. Fig. 3 is a perspective view of a burial-casket embodying my invention.

My invention relates to the application of cloth to moldings and other articles of manufacture, and has special reference to the method of bringing the edges neatly together, whether two different fabrics are employed, or where two edges of the same fabric are brought together.

In the accompanying drawings I have illustrated my invention as applied to molding, and more particularly in the manufacture of burial-caskets. I design the application of my invention to any other articles of manufacture where it may be advantageously employed wherever two edges of fabric come together.

Heretofore in the manufacture of burial-caskets, for instance, which are covered with cloth, it has been common, where two edges of the cloth come together, to adjust the edges suitably together, and to secure over the edges a strip of tape, ribbon, or other suitable material to produce a neat appearance and finish. It has also been common in the manufacture of moldings covered with fabric, in order to avoid an unsightly edge—as, for instance, where the molding is covered with two or more different kinds of cloth, or cloth of different shades of color—to construct the molding itself in separate parts, and to secure the cloth upon each of said parts, and then to unite the parts, the edges of the fabric thus being hidden from view between said united parts of the molding. This operation involves needless expense. Other methods have been employed, also, to overcome the difficulty in uniting the edges of the fabric upon the article manufactured, and to make a neat appearance, and it is the object of my invention to accomplish this result by cutting into the molding or other article of manufacture a suitable kerf or groove wherever the edges of the fabric come together, and forcing the edges of the fabric into said kerf in any suitable manner.

I carry out my invention as follows:

A represents any ordinary molding. In Fig. 1 the molding shown is what is called in the manufacture of burial-caskets a "cove" molding, upon which three different fabrics, $A'$ $A^2$ $A^3$, are secured, said molding constructed at the intersection of the edges of the fabric with kerfs $a$ $a'$ $a^2$, said kerfs in this instance running longitudinally with the molding. In covering the molding, glue or other adhesive substance is applied, in the usual manner, to the molding. The cloth is applied thereto in the usual way, except that the cloth is pressed into the kerf, which may be readily done either by the thumbnail or a suitable instrument. The cloth is then cut by running a knife across it in the groove. Ordinarily the process of forcing the cloth into the kerf or groove and cutting it so that the edge may be projected into the groove may be done by one and the same operation of the knife. The knife at the same time forces the fabric into the groove and cuts it. In this manner any suitable number of different fabrics may be applied to a molding—as, for instance, as illustrated in Fig. 1, different shades of fabric may be employed upon the face of the molding and a suitable lining be applied upon the opposite side. In Fig. 2 the same idea is carried out in a slightly different manner to what is known in the manufacture of burial-caskets as a "base" molding. In this instance it is desired to cover the base molding with fabric and to apply the molding to the shell of the casket in such a manner that the edges of the fabric upon the molding and upon the shell of the casket will be hidden from view in a neat manner. To this end the kerf or groove is made upon the inner face of the molding, as shown at $a^3$ and $a^4$. The cloth is made to adhere to the molding in any suitable manner, the edge being brought over and into the kerf. This may be done after the molding is applied to the shell of the casket, as also the operation of applying the fabric upon the shell of the casket, the fabric being forced into its proper groove and then cut, although, of course, the fabric may first be cut off just the desired dimensions, if preferred, the edge being protected from view by being projected into the groove, as above described. Not only is this process applicable to the manufacture of molding, but it is also applicable in other locations in the manufacture of caskets and other articles of manufacture.

As shown in Fig. 3, B represents the burial-casket. B' and $B^2$ are the head and foot panels upon the casket-cover. $B^3$ is the center panel. In applying the fabric to the cover it is customary to cover these panels separately, and to run strips of fabric the whole length of the cover upon the edges, and then to apply suitably sized pieces in the intervening spaces— as, for instance, as illustrated at $B^4$ and $B^5$. In this case it will be seen that the edges of the fabric must necessarily come together. Now, by cutting a suitable kerf or groove in the cover at $b$ $b'$ $b^3$, the fabric may at this point be forced into the groove and cut as described, dispensing with the necessity of applying a cover of ribbon, as has heretofore been customary, to cover up the adjacent edges. So, also, at the ends of the casket, where it has heretofore been necessary to bring edges of cloth together, and to cover them with tape or ribbon, a suitable kerf or groove may be cut, as at C C' $C^2$, &c., and the fabric be secured in said grooves in the same way, dispensing with the necessity of covering the edges in order to make a neat finish. The same method may be employed upon the shell of the casket where two edges come together, as at $C^3$, or on any other articles of manufacture covered by fabric. This process of providing the molding or other portion of the casket or other articles of manufacture with a suitable kerf or groove, and by pressing the fabric into said groove and cutting off the same, if need be, by the application of a knife to the cloth in said groove, is a simple operation which may be readily and quickly accomplished, and by properly limiting the width of the kerf or groove to the cloth to be applied in this manner a neat and tasteful finish may be attained, this method also resulting in a saving of material and time, while it may also be done by unskilled labor.

What I claim is—

A molding covered with fabric, said molding provided with one or more kerfs or grooves and the fabric pressed into said grooves, the construction being such that the edges of the fabric may be suitably concealed in said grooves, substantially as described.

In testimony whereof I sign this specification in the presence of two witnesses.

ALFRED FRESCHL.

Witnesses:
N. S. WRIGHT,
M. B. O'DOGHERTY.